United States Patent
Törnblom

(10) Patent No.: US 9,452,435 B2
(45) Date of Patent: Sep. 27, 2016

(54) SEPARATING DEVICE, AN INTERNAL COMBUSTION ENGINE AND CENTRIFUGAL SEPARATOR ASSEMBLY AND A METHOD OF SEPARATING CONTAMINANTS FROM CRANKCASE GAS

(71) Applicant: ALFA LAVAL CORPORATE AB, Lund (SE)

(72) Inventor: Olle Törnblom, Tullinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 124 days.

(21) Appl. No.: 14/351,101

(22) PCT Filed: Oct. 23, 2012

(86) PCT No.: PCT/EP2012/070968
§ 371 (c)(1),
(2) Date: Apr. 10, 2014

(87) PCT Pub. No.: WO2013/060678
PCT Pub. Date: May 2, 2013

(65) Prior Publication Data
US 2014/0230381 A1      Aug. 21, 2014

(30) Foreign Application Priority Data

Oct. 24, 2011   (EP) .................................... 11186346

(51) Int. Cl.
*B01D 45/00*      (2006.01)
*B04B 5/08*       (2006.01)
(Continued)

(52) U.S. Cl.
CPC .............. *B04B 5/08* (2013.01); *B01D 21/262* (2013.01); *B01D 45/14* (2013.01); *B04B 5/10* (2013.01);
(Continued)

(58) Field of Classification Search
CPC .... B01D 45/14; B01D 45/08; B01D 21/262; B04B 2005/125; B04B 5/12; B04B 5/08; B04B 5/10; B04B 11/02; B04B 13/00; F01M 2013/0494; F01M 13/04; F01M 2013/0488; F01M 2013/0422; A61M 1/3693
USPC .......... 55/317, 385.1, 461, 447, 438, 434.1, 55/400–409
See application file for complete search history.

(56) References Cited

U.S. PATENT DOCUMENTS 3,234,716 A * 2/1966 Sevin ..................... B01D 45/14
209/710
3,652,482 A * 3/1972 Burke, Jr .................. C08J 3/03
523/318
(Continued)

FOREIGN PATENT DOCUMENTS

| DE | 3541204 A1 | 5/1987 |
|----|------------|--------|
| DE | 195 15 482 A1 | 10/1996 |
| EP | 0 685 635 A1 | 12/1995 |
| GB | 1 195 470 | 6/1970 |
| WO | WO 04/001200 A1 | 12/2003 |

*Primary Examiner* — Dung H Bui
(74) *Attorney, Agent, or Firm* — Birch, Stewart, Kolasch & Birch, LLP

(57) ABSTRACT

An internal combustion engine and centrifugal separator assembly separates contaminants from crankcase gas. A crankcase is connected to the centrifugal separator including a centrifugal rotor. A rotor housing delimits a separation space in which the centrifugal rotor is arranged to rotate. A gas inlet conducts crankcase gas to a central part of the centrifugal rotor. A gas outlet communicates with a part of the separation space surrounding the centrifugal rotor and to conduct cleaned crankcase gas out of the separation space. A particle outlet communicates with the part of the separation space. The particle outlet is connected to a collector for the separated particles. The collector is configured to communicate with the gas inlet via a connection to provide a pressure difference between the particle outlet and the collector. The separated particles are drawn out of the particle outlet and into the collector during operation of the centrifugal separator.

19 Claims, 3 Drawing Sheets

(51) Int. Cl.
*B01D 45/14* (2006.01)
*B01D 21/26* (2006.01)
*B04B 5/12* (2006.01)
*B04B 11/02* (2006.01)
*F01M 13/04* (2006.01)
*B04B 5/10* (2006.01)

(52) U.S. Cl.
CPC ............... *B04B 5/12* (2013.01); *B04B 11/02* (2013.01); *F01M 13/04* (2013.01); *B04B 2005/125* (2013.01); *F01M 2013/0422* (2013.01); *F01M 2013/0488* (2013.01)

(56) References Cited

U.S. PATENT DOCUMENTS

| | | |
|---|---|---|
| 7,465,341 B2 | 12/2008 | Eliasson |
| 2003/0131571 A1* | 7/2003 | Demarco ............... B01D 45/16 55/324 |
| 2009/0025662 A1* | 1/2009 | Herman ................ F01M 13/04 123/41.86 |
| 2009/0199826 A1 | 8/2009 | Meinig et al. |
| 2010/0126441 A1 | 5/2010 | Hornung |
| 2012/0040816 A1* | 2/2012 | Thorwid ................. B04B 7/02 494/14 |

* cited by examiner

SEPARATING DEVICE, AN INTERNAL COMBUSTION ENGINE AND CENTRIFUGAL SEPARATOR ASSEMBLY AND A METHOD OF SEPARATING CONTAMINANTS FROM CRANKCASE GAS

TECHNICAL FIELD

The invention relates to a separating device for separating contaminants in the form of liquid and/or solid particles from crankcase gas which is produced during operation of an internal combustion engine according to the preamble of claim 1.

The invention also relates to an internal combustion engine and centrifugal separator assembly for separating contaminants in the form of liquid and/or solid particles from crankcase gas which is produced during operation of the engine according to the preamble of claim 5.

The invention furthermore relates to a method of separating contaminants in the form of liquid and/or solid particles in crankcase gas which is produced during operation of an internal combustion engine according to the preamble of claim 14.

BACKGROUND ART

FIG. 1 discloses an internal combustion engine and centrifugal separator assembly for separating contaminants in the form of liquid and/or solid particles from crankcase gas which is produced during operation of the engine. A crankcase of the engine is arranged to ventilate contaminated crankcase gas through the centrifugal separator. Hence, the crankcase is connected to a gas inlet of the centrifugal separator via a regulating valve which is arranged to maintain a desired gas pressure in the crankcase at different running conditions of the combustion engine (e.g. at different engine loads and/or speeds resulting in different amounts of crankcase gas being produced).

The gas inlet is configured to conduct crankcase gas, which is to be cleaned, to a central part of a centrifugal rotor. The centrifugal rotor comprises a plurality of separation discs for separating the particles from the crankcase gas, the centrifugal rotor being rotatably arranged in a separation space inside a rotor housing. The cleaned crankcase gas is discharged from the rotor housing through a gas outlet, which is configured to communicate with a part of the separation space surrounding the centrifugal rotor.

The particles in the crankcase gas are separated by the separation discs and thrown from the centrifugal rotor onto an inside wall of the rotor housing. A particle outlet communicates with the part of the separation space surrounding the centrifugal rotor, wherein the separated particles will flow down along the inside wall and out of the separation space via the particle outlet. The separated particles are thereafter conducted to the crankcase of the engine.

The shown system is configured as a so called closed crankcase ventilation system. Accordingly, the cleaned crankcase gas from the gas outlet of the centrifugal separator is connected to an air intake of the engine. The gas outlet is connected to the air intake downstream of an air filter and upstream of a compressor of a turbocharger.

During normal operation of the engine and the centrifugal separator, the gas pressure in the separation space surrounding the centrifugal rotor is higher than the pressure in the crankcase. Such a pressure difference is desirable, because it promotes the flow of separated particles out of the particle outlet to the crankcase of the engine. A small fraction of the cleaned crankcase gas may flow through the particle outlet to the crankcase, which improves the drainage by drawing the separated particles out of the particle outlet and into the crankcase.

There is a risk however that the pressure in the separation space surrounding the centrifugal rotor becomes lower than the pressure in the crankcase. This could for instance be due to a pressure drop over the air intake filter, and/or a pressure drop over the regulating valve between the crankcase and the centrifugal separator. This results in an undesired pressure difference, between the separation space and the crankcase, which counteracts or prevents the flow of separated particles to the crankcase. It may even cause an undesired flow of crankcase gas to the centrifugal separator via the particle outlet. The improper drainage of separated particles will eventually lead to contamination of the cleaned gas inside the separation space surrounding the centrifugal rotor.

SUMMARY OF THE INVENTION

An object of the invention is to minimize the above mentioned risk and provide a reliable drainage of the separated particles from the centrifugal separator.

This object is achieved by the initially defined separating device, which is characterized by comprising a collector for the separated particles, wherein the particle outlet is connected to said connector, and wherein the collector is configured to communicate with the gas inlet via a connection to provide a pressure difference between the collector and the particle outlet, whereby the separated particles are drawn out of the particle outlet and into the collector during operation of the centrifugal separator In this way, the invention makes use of a reliable pressure difference created by a centrifugal rotor in operation. The centrifugal rotor will work as a centrifugal fan having a lower pressure at the gas inlet than the pressure in the separation space surrounding the centrifugal rotor. This pressure difference is utilized to drain the separated particles into the collector. A small fraction of cleaned gas can hereby circulate through the particle outlet and back to the gas inlet, via the collector, to effectively draw the separated particles out through the particle outlet and into the collector. Consequently, instead of the previously mentioned gas flow from the particle outlet to the crankcase, the invention can provide a circulating gas flow from the particle outlet to the gas inlet of the centrifugal separator. A more reliable drainage of separated particles is hereby achieved, and the risk of contaminating the cleaned gas in the separation space is reduced.

In an embodiment of the invention, the collector comprises a separator which is configured inside the collector in such a manner as to prevent the separated particles from being transferred via the connection and back to the gas inlet of the centrifugal separator.

In another embodiment of the invention, the separator inside the collector is configured as a cyclone separator. Accordingly, the inlet to the cyclone separator is arranged to the particle outlet of the centrifugal separator, and the gas outlet of the cyclone separator is arranged to the connection to the gas inlet of the centrifugal separator. The cyclone separator is furthermore arranged to discharge the separated particles to the crankcase of the engine.

In a further embodiment of the invention, the separator inside the collector is configured as a baffle separator. The baffles may for example form a labyrinth path by means of which the separated particles are collected inside the collector and thereby prevented from being transferred to the gas inlet.

The object is furthermore achieved by the initially defined engine and centrifugal separator assembly, which is characterized in that the particle outlet is connected to a collector for the separated particles, wherein the collector is configured to communicate with the gas inlet via a connection to provide a pressure difference between the particle outlet and the collector, whereby the separated particles are drawn out of the particle outlet and into the collector during operation of the centrifugal separator, the collector being connected to the crankcase to drain the collected particles to the crankcase.

In an embodiment of the invention, the collector is situated at such a height above the crankcase that the collected particles are drained to the crankcase by means of hydrostatic pressure.

In a further embodiment of the invention, there is a conduit which is arranged to conduct the separated particles from the collector to the crankcase, and the conduit includes a discharge end which is situated below an oil level in the crankcase. A liquid (oil) trap is thereby formed inside the crankcase which prevents the crankcase gas (oil mist) therein to flow the wrong way, i.e. from the crankcase via the conduit to the collector, or even further into the centrifugal separator.

In another embodiment of the invention, a one-way valve is arranged between the collector and the crankcase, the one-way valve preventing a flow direction from the crankcase to the collector, but allowing a flow direction from the collector to the crankcase.

In another embodiment of the invention, a pump is arranged between the collector and the crankcase, the pump being arranged for discharging separated particles out of the collector and into the crankcase. Thereby, it is possible to drain the collector by means of the pump.

In yet another embodiment of the invention, the collector comprises a separator which is configured inside the collector in such a manner as to prevent the collected particles from being transferred via the connection and back to the gas inlet of the centrifugal separator. The separator inside the collector may be configured as a cyclone separator or a baffle separator.

In another embodiment of the invention, the gas outlet is arranged to discharge cleaned crankcase gas to an air intake of the combustion engine.

The object is also achieved by the initially defined method, which is characterized in that the method also comprises the step of draining the separated particles from the particle outlet to a collector for the separated particles, the collector communicating with the gas inlet via a connection to provide a pressure difference between the collector and the particle outlet, whereby the separated particles are drawn out of the particle outlet and into the collector during operation of the centrifugal separator, and wherein the collected particles in the collector is drained to the crankcase which is connected to the collector.

In an embodiment of the invention, the collected particles are drained to the crankcase through hydrostatic pressure by means of the collector being situated at a height above the crankcase.

BRIEF DESCRIPTION OF THE DRAWINGS

An embodiment of the invention will now be described, by way of example, and with reference to the drawings attached hereto.

DETAILED DESCRIPTION OF AN EMBODIMENT

Figure 1:
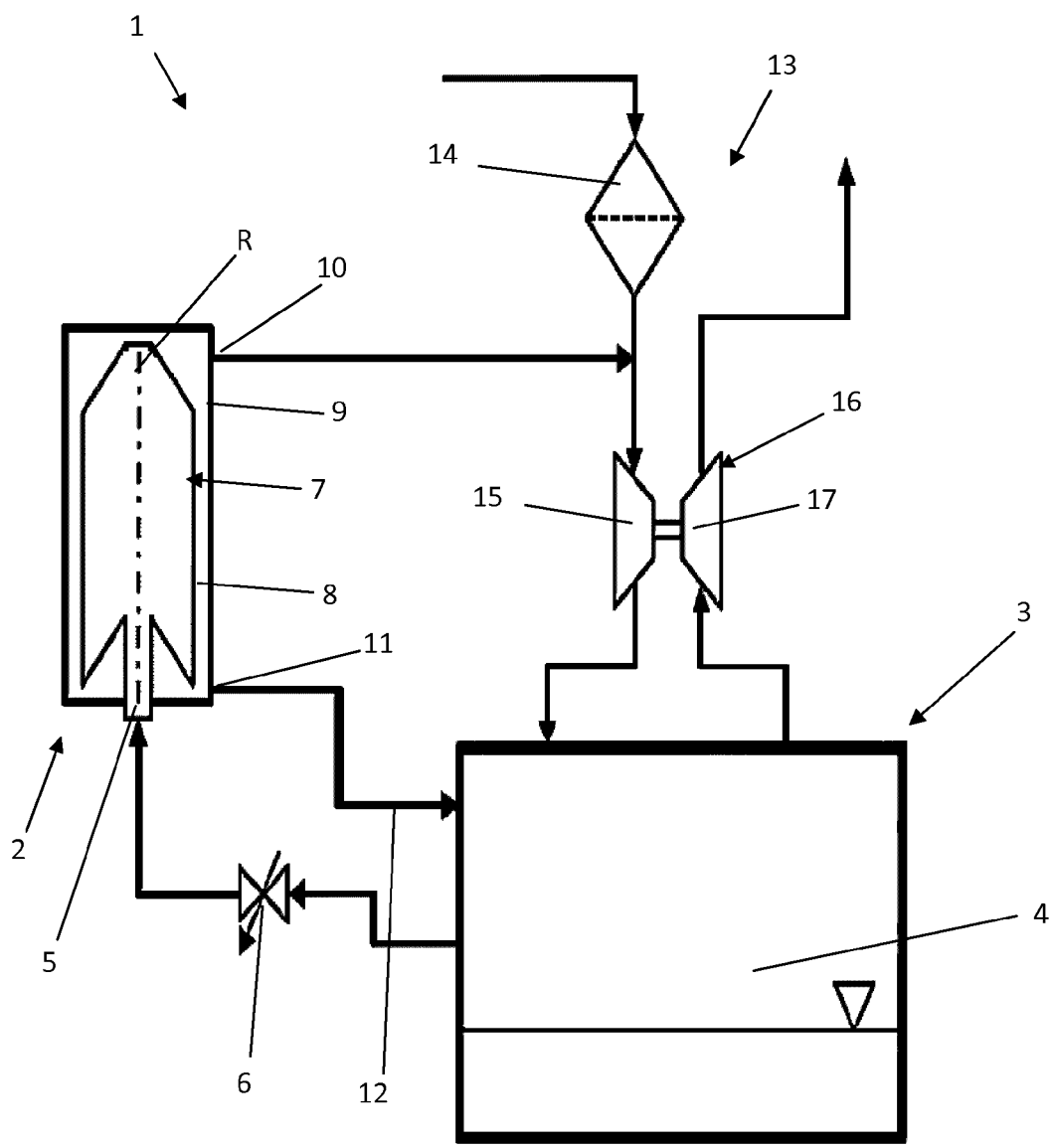
FIG. 1 shows an internal combustion engine and a centrifugal separator assembly.

FIG. 1 shows an internal combustion engine and a centrifugal separator assembly 1. Hence, a centrifugal separator 2 is arranged to a combustion engine 3 having a crankcase 4 which is configured to ventilate contaminated crankcase gas through the centrifugal separator 2. As can be seen the crankcase 4 is connected to a gas inlet 5 of the centrifugal separator 2 via a regulating valve 6 which is arranged to maintain a desired gas pressure in the crankcase 4 during different running conditions for the combustion engine 3 (e.g. different load and speed conditions giving different blow-by flow rates).

The centrifugal separator 2 is arranged for separating contaminants in the form of oil mist and soot particles from the crankcase gas by means of a centrifugal rotor 7 with a plurality of separation discs (not shown). The centrifugal rotor 7 is arranged to rotate about a rotational axis R in a separation space 8 inside a rotor housing 9.

As can be seen the rotor housing 9 is provided with the gas inlet 5 which is arranged to conduct crankcase gas, which is to be cleaned, from the crankcase 4 to a central part of the centrifugal rotor 7. Furthermore, the rotor housing 9 is provided with a gas outlet 10 for discharging cleaned crankcase gas out of the rotor housing 9. The gas outlet 10 is arranged to communicate with a part of the separation space 8 surrounding the centrifugal rotor 7.

The rotor housing 9 is also provided with a particle outlet 11 which is arranged to communicate with the part of the separation space 8 surrounding the centrifugal rotor 7 and to discharge the separated particles from the separation space. Hence, the separated particles, which has been separated by the separation discs and thrown from the centrifugal rotor 7 during operation onto an inside wall of the rotor housing 9, will flow down along the inside wall and out of the rotor housing 9 via the particle outlet 11. The particle outlet 11 is connected to a conduit 12 which is arranged to conduct the separated particles (or oil) back to the crankcase 4 of the combustion engine 3.

The shown assembly is configured as a so called closed crankcase ventilation system in which the gas outlet 10 of the centrifugal separator is connected to an air intake 13 of the combustion engine. The air intake 13 comprises an air intake filter 14 and a compressor 15 of a turbocharger 16. The compressor 15 of the turbocharger 16 is connected to a turbine 17 which is driven by the engine's exhaust gases. The gas outlet 10 is connected to the air intake 13 downstream of the air filter 14 and upstream of the compressor 15.

As previously mentioned there is a possibility that the operating conditions give rise to a lower pressure in the separation space 8 surrounding the centrifugal rotor 7 than the pressure inside the crankcase 4. This undesired pressure difference could be due to a combination of a pressure drop over the air intake filter 14 and the regulating valve 6 on the conduit between the crankcase 4 and the centrifugal separator 2. Such an undesired pressure difference would prevent the drainage of the separated particles (or oil) through the particle outlet 11. It may even cause the crankcase gas to flow the wrong way in the conduit 12, from the crankcase 4 and via the particle outlet 11, into the separation space 8. An improper drainage of separated particles will eventually lead to contamination of the cleaned gas inside the separation space 8 surrounding the centrifugal rotor 7.

Figure 2:
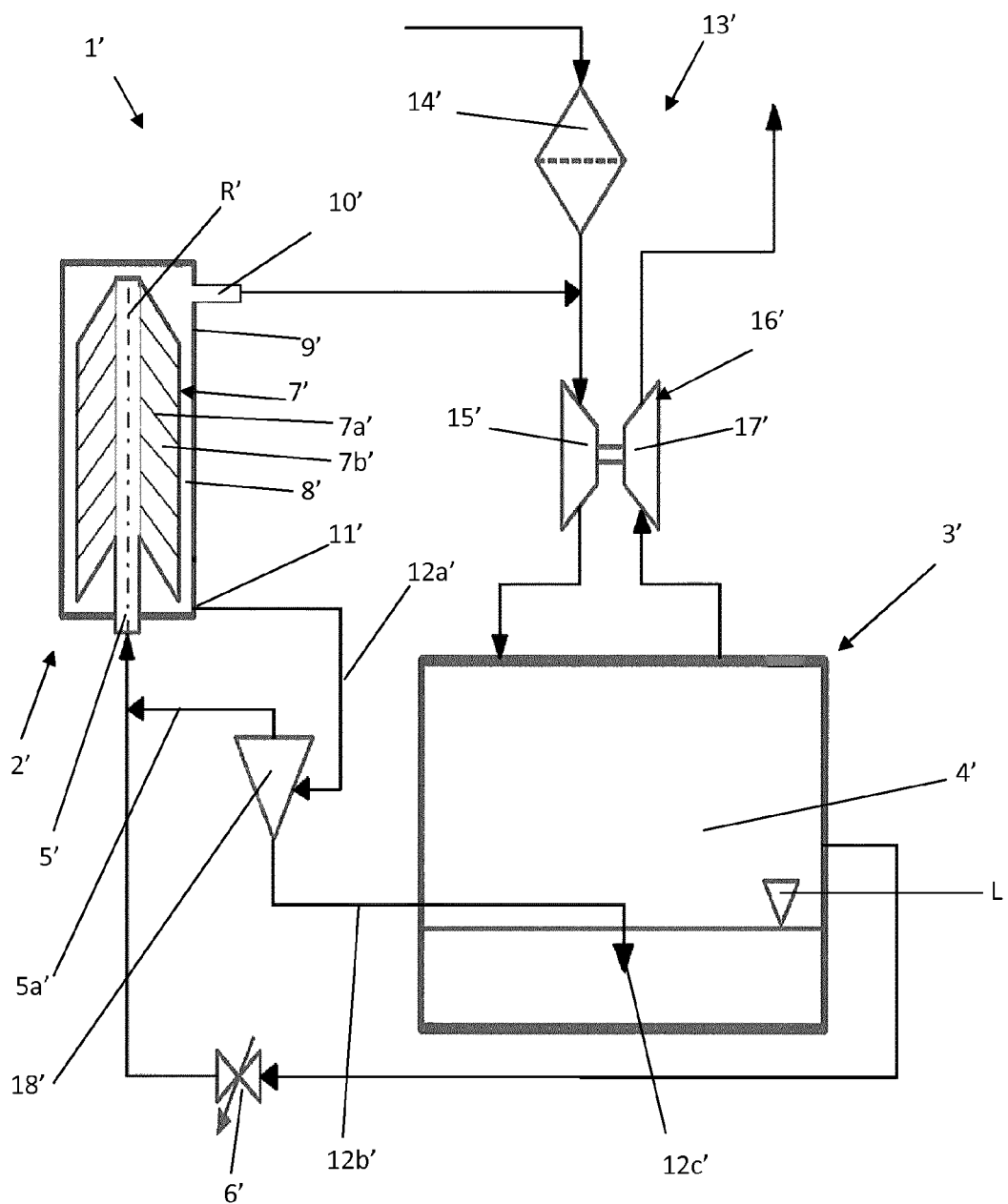
FIG. 2 shows an embodiment of the invention which includes a centrifugal separator having a collector for separated particles which is arranged between a crankcase of an internal combustion engine and the centrifugal separator.

FIG. 2 shows an embodiment of an internal combustion engine and a centrifugal separator assembly 1' according to the invention. The shown embodiment provides a solution which reduces the above mentioned risk and provides a reliable drainage of the separated particles from the centrifugal separator. In accordance with the previously described assembly, the embodiment of the invention includes a centrifugal separator 2' which is arranged to a combustion engine 3' having a crankcase 4' which is configured to ventilate contaminated crankcase gas through the centrifugal separator 2'. The crankcase 4' is connected to a gas inlet 5' of the centrifugal separator 2' via a regulating valve 6' which is arranged to maintain a desired gas pressure in the crankcase 4' during different running conditions for the combustion engine 3 (e.g. different load and speed conditions giving different blow-by flow rates).

The centrifugal separator 2' is arranged for separating contaminants in the form of oil mist and soot particles from the crankcase gas by means of a centrifugal rotor 7' with a plurality of separation discs 7a'. The centrifugal rotor 7' is arranged to rotate about a rotational axis R' in a separation space 8' inside a rotor housing 9'. The rotor housing 9' is provided with the gas inlet 5' which is arranged to conduct crankcase gas, which is to be cleaned, from the crankcase 4' to a central part of the centrifugal rotor 7'. As can be seen the centrifugal rotor 7' includes of stack of separation discs 7a' arranged on top of each other. The separation discs 7a' are provided with distance members to provide axial interspaces 7b' for through-flow of the gas from the central part of the centrifugal rotor 7' and radially outwardly through the interspaces 7b' between the separation discs 7a'. Only a few separation discs 7a' are shown with an extremely exaggerated size on the interspaces 7b'. In practice however the centrifugal rotor 7' would include many more separation discs 7a' with thin interspaces 7b' formed between mutually adjacent separation discs 7a'. The height of the interspaces 7b' will typically be somewhere in the range of 0.2-0.6 mm.

In operation the centrifugal rotor 7' will bring the crankcase gas into rotation, whereby particles mainly in the form of oil mist is separated by centrifugal forces in the rotating crankcase gas which is flowing through the thin interspaces 7b' between the separation discs 7a'. The interspaces 7b' open into a radial outer part of the separation space 8' which surrounds the centrifugal rotor 7'. The cleaned crankcase gas is discharged into this outer part of the separation space 8'. A gas outlet 10' is arranged to communicate with the part of the separation space 8' surrounding the centrifugal rotor 7', wherein the cleaned gas is conducted out of the rotor housing 9' through the gas outlet 10'.

The centrifugal forces acting on the rotating gas will cause the particles to deposit on the surfaces of the separation discs 7a'. Separated particles will thereafter be thrown from the separation discs 7a' of the centrifugal rotor 7' onto the inside wall of the stationary rotor housing 9'. The rotor housing 9' is provided with a particle outlet 11' which is arranged to communicate with the part of the separation space 8' surrounding the centrifugal rotor 7' and to discharge the separated particles from the separation space 8'. Hence, the separated particles (mainly oil) will flow down along the inside wall of the rotor housing 9' to the particle outlet 11' which is arranged for discharging the separated particles (oil) out of the separation space 8'.

The particle outlet 11' is connected to a first outlet conduit 12a' which is arranged to conduct the separated particles (or oil) to a collector 18' for the separated particles. As can be seen the collector 18' is configured with a connection 5a' to the gas inlet 5' to provide a pressure difference between the particle outlet 11' and the collector 18'. As previously mentioned, the centrifugal rotor in operation generates a lower pressure at the gas inlet 5' than the pressure at the particle outlet 11'. Accordingly, the reduced pressure at the inlet 5' is communicated to the collector 18' via the connection 5a' and the separated particles are thereby drawn out of the particle outlet 11' and into the collector 18' during operation of the centrifugal separator 2'. Furthermore, a small fraction of cleaned gas may circulate through the particle outlet 11' and back to the gas inlet 5' via the connection 5a' to effectively draw the separated particles out through the particle outlet 11' and into the collector 18'.

In the shown embodiment the collector 18' is configured as a cyclone separator. Accordingly, the inlet to the cyclone separator is arranged to the particle outlet 11' via the first outlet conduit 12a', and the gas outlet of the cyclone separator is arranged via the connection 5a' to the gas inlet 5' of the centrifugal separator. In this way the collector 18' is configured to prevent the separated particles from being transferred back to the gas inlet 5' via the connection 5'. The collector 18' or cyclone separator is furthermore arranged to discharge the separated particles via a second outlet conduit 12b'. Consequently, the separated particles which accumulate in the collector 18' are returned to the crankcase 4' through the second outlet conduit 12'b. As shown the collector 18' is situated at such a height above the crankcase 4' that the collected particles are drained to the crankcase 4' by means of hydrostatic pressure (i.e. by gravity). Furthermore, the second outlet conduit 12b' includes a discharge end 12c' which is situated below an oil level L in the crankcase 4'. A liquid (oil) trap is thereby formed inside the crankcase 4' which further prevents the crankcase gas (oil mist) therein to flow the wrong way, i.e. from the crankcase 4' via the second outlet conduit 12b' to the collector 18', or even further into the centrifugal separator 2' via the first outlet conduit 12a' or the connection 5a'.

The shown assembly is configured as a so called closed crankcase ventilation system in which the gas outlet 10' of the centrifugal separator is connected to an air intake 13' of the combustion engine. The air intake 13' comprises an air intake filter 14' and a compressor 15' of a turbocharger 16'. The compressor 15' of the turbocharger 16' is connected to a turbine 17' which is driven by the engine's exhaust gases. The gas outlet 10' is connected to the air intake 13' downstream of the air filter 14' and upstream of the compressor 15'.

The invention is not limited to the shown embodiment but may be varied and modified within the scope of the claims set out below.

Figure 3:
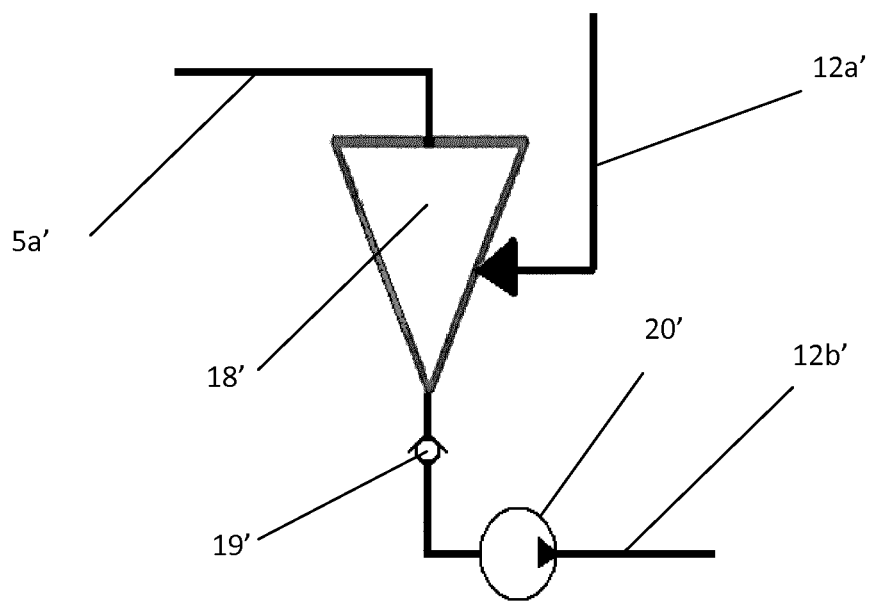
FIG. 3 shows another embodiment of the collector which is provided with a one-way valve and a pump.

For example, the second outlet conduit 12b' may be provided with a one-way valve 19' (see FIG. 3) which is arranged to prevent a flow direction from the crankcase 4' to the collector 18', but allowing a flow direction from the collector 18' to the crankcase 4'. The one-way valve 19' would thereby prevent crankcase gas (oil mist) or oil in the crankcase to flow the wrong way, e.g. even if the discharge end 12c' of the second outlet conduit 12b' is situated above the oil level L in the crankcase. Furthermore, the second outlet conduit 12b' could be provided with a pump 20' for discharging the separated particles out of the collector 18' and into the crankcase 4'. Such a pump 20' could be used as an alternative to using the hydrostatic pressure as a means of draining the collected particles from the collector 18' to the crankcase 4'. Such a pump 20' may also be used in the unfortunate event that the second outlet conduit 12b' clogged up, and the drainage of the collected particles was prevented (e.g. by trapped dirt or air bubbles in the second outlet conduit 12b'). In these situations the pump could be triggered to pressurize and thereby flush the second outlet conduit 12b' clean in order to restore unhindered drainage of separated particles from the collector 18'. Furthermore, the valve 19' and pump 20' shown in FIG. 3 could be used separately in connection with the collector 18'. Accordingly, the second outlet conduit 12b' of the collector 18' may be provided with the one-way valve 19' only, without the pump 20', and vice versa. The collector 18' may furthermore be integrated into the centrifugal separator; for instance it may be integrated into a lower part of the rotor housing 9', whereby the external first outlet conduit 12a' and the connection 5a' could also be integrated into the rotor housing 9'.

The invention claimed is:

1. A separating device comprising:
a centrifugal separator for separating contaminants in the form of liquid and/or solid particles from crankcase gas which is produced during operation of an internal combustion engine, the centrifugal separator comprising:
a centrifugal rotor with a plurality of separation discs for separating the particles from the crankcase gas, the centrifugal rotor having a central passage;
a rotor housing delimiting a separation space in which the centrifugal rotor is arranged to rotate about a rotational axis;
a gas inlet arranged to conduct crankcase gas, which is to be cleaned, directly to the passage of the centrifugal rotor;
a gas outlet in communication with a part of the separation space surrounding the centrifugal rotor, the gas outlet conducting cleaned crankcase gas out of the separation space; and
a particle outlet in communication with the part of the separation space surrounding the centrifugal rotor, the particle outlet draining the separated particles out of the separation space; and
a collector for the separated particles,
wherein the particle outlet is connected to said collector, and
wherein the collector is configured to communicate with the gas inlet via a connection to provide a reduced pressure in the collector, whereby the separated particles are drawn out of the particle outlet and into the collector during operation of the centrifugal separator.

2. The separating device according to claim 1, wherein the collector comprises a separator which is configured inside the collector in such a manner as to prevent the collected particles from being transferred via the connection and back to the gas inlet of the centrifugal separator.

3. The separating device according to claim 2, wherein the separator inside the collector is configured as a cyclone separator.

4. The separating device according to claim 2, wherein the separator inside the collector is configured as a baffle separator.

5. An internal combustion engine and centrifugal separator assembly for separating contaminants in the form of liquid and/or solid particles from crankcase gas which is produced during operation of the engine, wherein a crankcase of the engine is connected to the centrifugal separator comprising:
a centrifugal rotor with a plurality of separation discs for separating the particles from the crankcase gas;
a rotor housing delimiting a separation space in which the centrifugal rotor is arranged to rotate about a rotational axis during operation;
a gas inlet connected to the crankcase and arranged to conduct crankcase gas, which is to be cleaned, directly to a center of the centrifugal rotor;
a gas outlet in direct communication with a part of the separation space surrounding the centrifugal rotor, the gas outlet conducting cleaned crankcase gas out of the separation space;
a particle outlet in direct communication with the part of the separation space surrounding the centrifugal rotor, the particle outlet draining the separated particles out of the separation space; and
a collector for the separated particles,
wherein the particle outlet is connected to said collector, and wherein the collector is configured to communicate with the gas inlet via a connection to provide a pressure difference between the collector and the particle outlet, whereby the separated particles are drawn out of the particle outlet and into the collector during operation of the centrifugal separator, the collector being connected to the crankcase to drain the collected particles to the crankcase, and
wherein the collector comprises a separator which is configured inside the collector to prevent the collected particles from being transferred via the connection and back to the gas inlet of the centrifugal separator.

6. The assembly according to claim 5, wherein a one-way valve is arranged between the collector and the crankcase, the one-way valve preventing a flow direction from the crankcase to the collector, but allowing a flow direction of separated particles from the collector to the crankcase.

7. The assembly according to claim 5, wherein a pump is arranged between the collector and the crankcase, the pump being arranged for discharging separated particles out of the collector and into the crankcase.

8. The assembly according to claim 5, wherein the separator inside the collector is configured as a cyclone separator.

9. The assembly according to claim 5, wherein the separator inside the collector is configured as a baffle separator.

10. The assembly according to claim 5, wherein the gas outlet is arranged to discharge cleaned crankcase gas to an air intake of the combustion engine.

11. The assembly according to claim 5, wherein the collector is situated at such a height above the crankcase that the collected particles are drained to the crankcase by means of hydrostatic pressure.

12. The assembly according to claim 11, wherein a conduit is arranged to conduct the separated particles from the collector to the crankcase, and the conduit includes a discharge end which is situated below an oil level in the crankcase.

13. The assembly according to claim 11, wherein a one-way valve is arranged between the collector and the crankcase, the one-way valve preventing a flow direction from the crankcase to the collector, but allowing a flow direction of separated particles from the collector to the crankcase.

14. The assembly according to claim 11, wherein a pump is arranged between the collector and the crankcase, the pump being arranged for discharging separated particles out of the collector and into the crankcase.

15. The assembly according to claim 5, wherein a conduit is arranged to conduct the separated particles from the collector to the crankcase, and the conduit includes a discharge end which is situated below an oil level in the crankcase.

16. The assembly according to claim 15, wherein a one-way valve is arranged between the collector and the crankcase, the one-way valve preventing a flow direction from the crankcase to the collector, but allowing a flow direction of separated particles from the collector to the crankcase.

17. The assembly according to claim 15, wherein a pump is arranged between the collector and the crankcase, the pump being arranged for discharging separated particles out of the collector and into the crankcase.

18. A method of separating contaminants in the form of liquid and/or solid particles in crankcase gas which is produced during operation of an internal combustion engine, wherein the method comprises the steps of:

conducting the crankcase gas from a crankcase of the engine to a centrifugal separator comprising a centrifugal rotor with a plurality of separation discs for separating the particles from the crankcase gas, the centrifugal rotor having a central passage being rotated about a rotational axis in a separation space which is delimited by a rotor housing, wherein the crankcase gas which is to be cleaned is directly conducted to the passage of the centrifugal rotor through a gas inlet connected to the crankcase, the cleaned crankcase gas being conducted out of the separation space through a gas outlet in direct communication with a part of the separation space surrounding the centrifugal rotor, and wherein the separated particles are drained out of the separation space through a particle outlet in direct communication with the part of the separation space surrounding the centrifugal rotor; and draining the separated particles from the particle outlet to a collector for the separated particles, the collector communicating with the gas inlet via a connection to provide a reduced pressure difference in the collector, whereby the separated particles are drawn out of the particle outlet and into the collector during operation of the centrifugal separator, and wherein the collected particles in the collector is drained to the crankcase which is connected to the collector.

19. The method according to claim 18, wherein the collected particles are drained to the crankcase through hydrostatic pressure by means of the collector being situated at a height above the crankcase.

\* \* \* \* \*